June 17, 1958     R. J. KENT     2,839,441
METHOD OF WELDING TOGETHER TWO PLASTIC OBJECTS
Filed Sept. 8, 1955

INVENTOR
R. J. KENT
BY
*H. O. Wright*
ATTORNEY

United States Patent Office 2,839,441
Patented June 17, 1958

2,839,441

METHOD OF WELDING TOGETHER TWO PLASTIC OBJECTS

Robert J. Kent, Summit, N. J., assignor to Bell Telephone Laboratories, Incorporated, New York, N. Y., a corporation of New York Application September 8, 1955, Serial No. 533,048

3 Claims. (Cl. 154—116)

This invention relates to the welding together of plastic parts and is directed more particularly to a method of obtaining strong, tight joints between such parts.

The use of plastics, such, for example, as polyethylene, polyethylene-butyl compound, and the like, in the fabrication of containers, shields or cases for electrical components and as insulation on electrical conductors is becoming quite common.

For some purposes, such, for example, as enclosures for the loading coils employed at intervals along a submarine cable, it is, obviously, necessary that the enclosures, including welded joints therein, be sufficiently strong and tight to withstand large stresses and pressures.

Accordingly, a principal object of the invention is to improve welded joints between plastic parts.

Welding of plastics has been familiar to those skilled in the art for some years. By way of illustration, reference may be had to an article entitled "Hot Gas Welding of Plastics" which appeared in the November 1950 issue of the magazine "Modern Plastics."

Applicant has found, however, that welds made in accordance with the teachings of the prior art do not consistently provide sufficient degrees of strength and tightness where the plastic joint must withstand large stresses and high pressures.

Accordingly, applicant has invented an improved welding method for plastic members which will withstand large stresses and high pressures. Briefly stated, the method, in a preferred illustrative specific form, comprises making a first substantially conventional weld in a V-shaped notch formed between abutting beveled edges of the two parts to be welded together, cutting a considerably broader "semi-oval" channel, centered with respect to said first weld to a depth such that a substantial portion of the first weld is removed, and then welding an appropriately "semi-oval" shaped strip of plastic into said "semi-oval" channel to fill the channel. The "double weld" thus formed has been found to be entirely adequate to withstand large stresses and high pressures under which prior art welds have frequently proven unsatisfactory. In some instances, where strength and/or tightness of the joint must be extremely high, three or more welds may comprise the composite or multiply welded joint, each successive weld being of broader base and more extensive contacting areas than the one over which it is superimposed.

Other objects, features and advantages of the invention will become apparent during the course of the detailed description of illustrative embodiments of the invention, given hereinunder, and from the appended claims.

Figure 1:
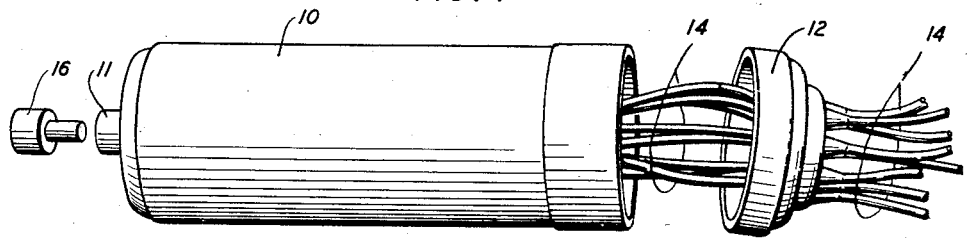
Fig. 1 shows a plastic case with plastic closure members for each end thereof.
Figure 2:
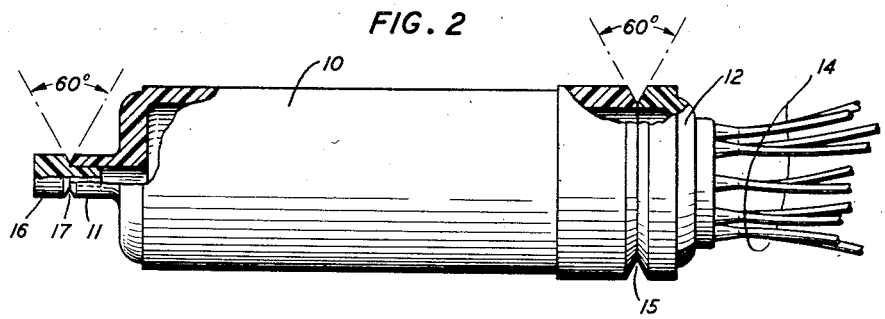
Fig. 2 illustrates the preparation of the abutting edges of the closure members and the case of Fig. 1 for performing the first welding operation in accordance with the invention.

In more detail in Figs. 1 and 2, a cylindrical plastic case 10, the right end of which is open and the left end of which includes a nipple 11 having a small opening therethrough (as shown more clearly in partial cross section in Fig. 2), is adapted to enclose an electrical element (not shown) such as a multiwinding loading coil. The leads 14 from the coil are plastic insulated and are molded through the end of plastic cap 12, as shown. A plug 16 is included to close the opening in nipple 11, after cap 12 has been welded to case 10 and the case has been filled, through nipple 11, with oil or other suitable, substantially non-compressible, fluid, for example, to assist the case in withstanding high external pressures.

The specific assembly being here described, by way of illustration, is intended as a casing for loading coils for use with submarine cables, but it is, of course, to be expressly understood that numerous and varied other arrangements intended for widely differing uses can be made in accordance with the principles of the present invention without departing from the scope of the invention.

To prepare for welding cap 12 to the right end of case 10, the cap is held firmly against the case as illustrated in Fig. 2 and a notch 15, having an apex angle of substantially 60 degrees, is machined so as to be centered about the junction plane of cap 12 with case 10, as shown in partial cross section in Fig. 2. Alternatively, the abutting edges of cap 12 and case 10 can, of course, each be separately given a bevel, sloping outwardly, of approximately 30 degrees. The angle of the notch or bevel is by no means critical and may vary over a wide range.

Figure 3:
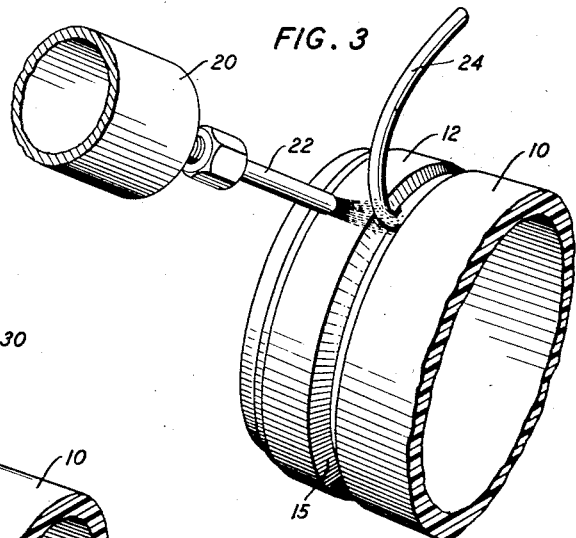
Fig. 3 illustrates the welding of a rod of plastic in the V-shaped channel between the larger closure member and the case of Fig. 1.

The first, or preliminary, weld between the beveled edges of cap 12 and case 10 is then made as indicated in Fig. 3 by pressing a heated rod (or tape) 24 of plastic into the notch. Rod 24 and the sides of the notch are preferably heated, for example, by directing a stream of heated gas on them from nozzle 22 of a flameless welding torch 20. Torch 20 may, by way of example, take either of the forms described in the above-mentioned November 1950 article in "Modern Plastics," namely, it can be either an electrically heated or a gas heated flameless welding torch.

The hot gas from torch 20 should be inert, for example, it may be nitrogen. The welding is preferably performed immediately after the abutting edges of cap 12 and case 10 have been beveled so that the newly exposed surfaces will be clean and free from oxidation. For polyethylene-butyl compound, the temperature of the gas stream should be substantially 470 degrees Fahrenheit and it should be under a pressure in the order of from ten to fifteen pounds per square inch at the input to the torch, for optimum results. Other plastics may require somewhat different specific conditions for optimum welding results, as is well understood by those skilled in the art.

Figure 4:
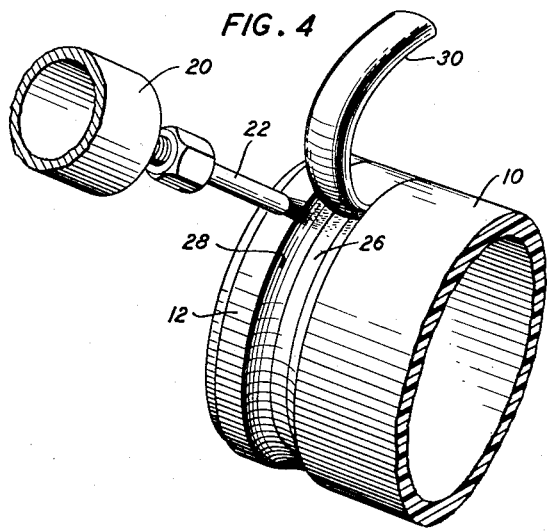
Fig. 4 shows the "semi-oval" channel cut over the initial weld and illustrates the second welding operation in accordance with the principles of the present invention.

After the preliminary weld, which should fill a substantial portion of the notch 15, has cooled, a broad semi-oval notch 28, Fig. 4, is cut, encircling the joint between cap 12 and case 10 and centered with respect to the abutting ends of 10 and 12 to a depth such that a sufficient portion of the preliminary weld is removed, to leave a portion 26 of said preliminary weld, the upper surface of which will form a smooth surface conforming at all points to the contour of the broad semi-oval notch.

Finally, plastic rod (or ribbon) 30, shaped to substantially fill notch 28, is welded into notch 28, substantially as was rod 24 into notch 15. Nozzle 22 of flameless welding torch 20 is swung from side to side of notch 28 to uniformly heat the whole of the surfaces to be welded. Successful results can be obtained by over-filling notch 28 and cutting excess material away, after the joint has cooled, to provide a smooth outer surface. The doubly, multiple, or tandem, welded plastic joint of the invention has been found to be much stronger and tighter than welded joints made in accordance with the prior art teachings. Since the particular assembly, employed for illustrative purposes in this description and shown in the drawings, is intended to be used with a submarine cable designed for a fault-free "life" of twenty years, and failure of any one of the several score of the devices, which will be used along a submarine cable system of average overall length, would result in disabling the channel with which it is associated, it is essential that a high degree of dependability (or stated in other words, a substantial factor of safety) against possible failure, be built into all component members of the overall cable system.

When cap 12 has been welded on the right end of case 20, as above described, and the weld has cooled, the case 10 is, in the present instance, in contemplation of submarine use, filled, through nipple 11, with oil or other suitable noncompressible fluid, to enable the case to withstand large external pressures, after which plug 16 is inserted in nipple 11 and a similar doubly welded plastic joint is effected between plug 16 and nipple 11, as described in detail above for cap 12.

A particular advantage of the double weld, in instances such as that just described above, where the casing has, previous of welding, been filled with a fluid, is believed to reside in the fact that some slight seepage of the fluid at least partially along one or the other of the lateral junction surfaces of the initial welded joint is likely to occur and to result in a weakness which, over a substantial period of service under large stresses and high pressure, may be prone to develop a weakness or a leak at the joint. Consequently, the addition of a second broader welded joint, made directly over the initial joint before such weaknesses can be developed and while the initial joint is capable of preventing any appreciable seepage of the fluid along the junction surfaces of the second weld, provides a high degree of assurance that defects will not be developed even after many years under the severe service conditions with which the apparatus is intended to be used.

For extreme conditions it is, of course, conceivable that a third and even a fourth weld superimposed upon the second weld, and the third weld, respectively, in successively broadened channels, might be required to assure a long life of fault-free operation for particular apparatus units and service conditions and the principles of the present invention are obviously directly applicable to such "multiply-welded" joints.

It is to be expressly understood that the above-described specific arrangements are illustrative only. It is obvious that those skilled in the art can readily devise numerous and varied other arrangements within the spirit and scope of the invention.

What is claimed is:

1. The method of welding two plastic objects together which comprises beveling the abutting edges of said objects to form a V-shaped groove, applying a plastic rod in said groove, simultaneously heating said rod and the surfaces of said groove to produce a first weld substantially filling said V-shaped groove, cutting a broader semi-oval groove centered about the center line of said V-shaped groove to a depth including a substantial portion of the said first weld, applying a plastic semi-oval rod substantially conforming with said semi-oval groove in said semi-oval groove and simultaneously heating said rod and the surfaces of said semi-oval groove to produce a second weld substantially filling said semi-oval groove whereby a strong, tight double weld between said two plastic objects is obtained.

2. The method of welding two plastic objects together which comprises making a first plastic weld extending substantially the full distance between the near and far surfaces of said objects, cutting away a portion of said weld and the adjacent surfaces of said objects to a width several times that of the maximum width of said first weld and a depth in the order of fifty percent of the depth of said first weld and superimposing upon the remaining portion of said first weld and the cut-out portions of the adjacent surfaces of said objects a second plastic weld substantially replacing the material removed in said cutting operation whereby a strong, tight, double plastic weld between said two objects is obtained.

3. The method of welding two plastic objects together which comprises making a first plastic weld extending substantially the full distance between the near and far surfaces of said objects, cutting away a portion of said weld and the adjacent surfaces of said objects to a width several times that of the maximum width of said first weld and a depth which is a substantial fraction of the total depth of said first weld and superimposing upon the remaining portion of said first weld and the cut-out portions of the adjacent surfaces of said objects a second plastic weld substantially replacing the material removed in said cutting operation, whereby a strong, tight, double plastic weld between said two objects is obtained.

References Cited in the file of this patent

UNITED STATES PATENTS

| | | |
|---|---|---|
| 1,899,067 | Trumbull | Feb. 28, 1933 |
| 2,220,545 | Reinhardt | Nov. 5, 1940 |
| 2,367,725 | Lindh et al. | Jan. 23, 1945 |
| 2,703,299 | Seymour et al. | Mar. 1, 1955 |